(12) United States Patent
Strege et al.

(10) Patent No.: US 12,013,232 B2
(45) Date of Patent: Jun. 18, 2024

(54) NON-CONTACT INSPECTION SYSTEM FOR MULTI-AXLE HEAVY-DUTY VEHICLES

(71) Applicant: Hunter Engineering Company, Bridgeton, MO (US)

(72) Inventors: Timothy A. Strege, Sunset Hills, MO (US); Daniel R. Dorrance, Ballwin, MO (US); Nicholas J. Colarelli, III, Frontenac, MO (US)

(73) Assignee: HUNTER ENGINEERING COMPANY, St. Louis, MO (US)

( * ) Notice: Subject to any disclaimer, the term of this patent is extended or adjusted under 35 U.S.C. 154(b) by 891 days.

(21) Appl. No.: 17/094,422

(22) Filed: Nov. 10, 2020

(65) Prior Publication Data

US 2021/0148702 A1    May 20, 2021

Related U.S. Application Data

(60) Provisional application No. 62/990,815, filed on Mar. 17, 2020, provisional application No. 62/935,463, filed on Nov. 14, 2019.

(51) Int. Cl.
*G01B 11/26* (2006.01)
*G01B 11/275* (2006.01)
*G06T 7/00* (2017.01)

(52) U.S. Cl.
CPC ........ *G01B 11/2755* (2013.01); *G06T 7/0004* (2013.01); *G01B 2210/20* (2013.01); *G06T 2207/30252* (2013.01)

(58) Field of Classification Search
CPC ............ G01B 11/2755; G01B 2210/20; G06T 7/0004; G06T 2207/30252
See application file for complete search history.

(56) References Cited

U.S. PATENT DOCUMENTS

| 8,804,107 B2 | 8/2014 | Giacomini et al. |
| 9,778,030 B2 | 10/2017 | McClenahan et al. |

(Continued)

FOREIGN PATENT DOCUMENTS

| EP | 1677071 A1 | 7/2006 | |
| JP | 5371299 B2 * | 12/2013 | .......... G01M 17/007 |

(Continued)

OTHER PUBLICATIONS ip.com Publication No. IPCOM000136159D, "Multi-Axle Vehicle Wheel Alignment System", pp. 1-9, (Apr. 2006).

*Primary Examiner* — Mark Hellner
(74) *Attorney, Agent, or Firm* — Sandberg Phoenix & von Gontard P.C.

(57) ABSTRACT

A heavy-duty vehicle measurement system utilizing displacement sensor modules disposed in housings on opposite sides of a vehicle inspection lane to acquire a set of displacement measurements associated with a moving heavy-duty vehicle. Displacement data along one or more measurement axes is acquired independently by each of the displacement sensor module to measure corresponding distances between the sensor module and points on a surface of the passing heavy-duty. A processing system is configured to receive and evaluate the set of displacement measurements, together with known parameters of the measurement system, to identify heavy-duty vehicle features, such as configuration, body panels, wheel assemblies, and tire surfaces, and to calculate heavy-duty vehicle parameters such as velocity, wheel rim or tire dimensions, axle relative orientations (scrub angles) and wheel assembly spatial orientations.

16 Claims, 5 Drawing Sheets

(56) References Cited

U.S. PATENT DOCUMENTS

| | | | |
|---|---|---|---|
| 9,779,560 B1 | 10/2017 | Dorrance et al. | |
| 9,779,561 B1 * | 10/2017 | Dorrance | G01B 11/026 |
| 9,791,268 B2 | 10/2017 | Buzzi et al. | |
| 10,068,389 B1 | 9/2018 | Strege et al. | |
| 10,222,455 B1 | 3/2019 | Stieff et al. | |
| 10,241,195 B1 | 3/2019 | Stieff et al. | |
| 10,408,610 B1 | 9/2019 | Bernard et al. | |
| 10,480,937 B2 | 11/2019 | Rajupillai | |
| 2014/0253909 A1 * | 9/2014 | McClenahan | G01B 11/2755 |
| | | | 356/139.09 |
| 2017/0219340 A1 | 8/2017 | Rajupillai | |

FOREIGN PATENT DOCUMENTS

| | | | | |
|---|---|---|---|---|
| JP | 4406507 B2 * | 1/2021 | | G01B 11/275 |
| WO | WO 2008014783 A1 * | 8/2007 | | G01B 11/2755 |

* cited by examiner

FIGURE 2 - PRIOR ART

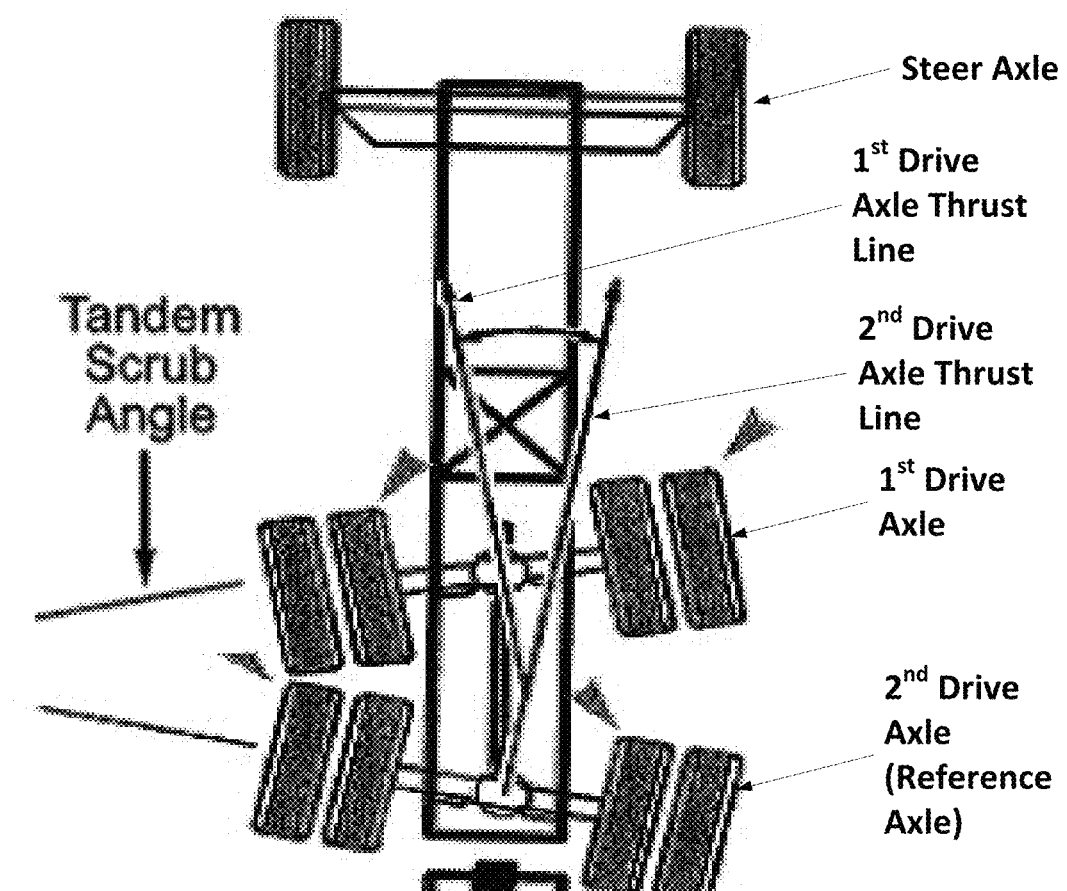
**FIGURE 4
PRIOR ART**
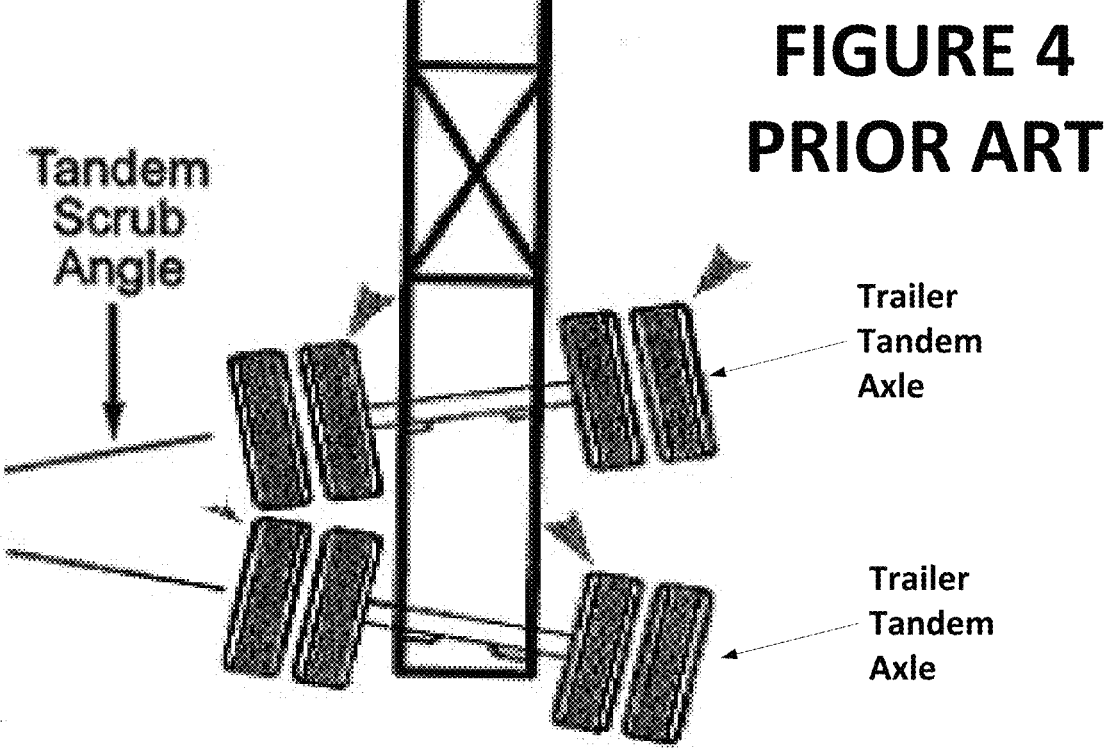

NON-CONTACT INSPECTION SYSTEM FOR MULTI-AXLE HEAVY-DUTY VEHICLES

CROSS-REFERENCE TO RELATED APPLICATIONS

The present application is related to, and claims priority from, U.S. Provisional Patent Application Ser. No. 62/935,463 filed on Nov. 14, 2019, and from U.S. Provisional Patent Application Ser. No. 62/990,815 filed on Mar. 17, 2020, both of which are herein incorporated by reference.

STATEMENT REGARDING FEDERALLY SPONSORED RESEARCH

Not Applicable.

BACKGROUND OF THE INVENTION

The present application is related to non-contact vehicle inspection systems, and in particular, to a drive-through displacement measurement system capable of acquiring data representative of the alignment of wheels and axles on various combinations of moving heavy-duty vehicles having three or more axles, such as trucks with or without trailers.

Heavy duty vehicles present several issues with respect to inspection and wheel alignment determination. Unlike passenger vehicles, heavy-duty vehicles typically have three or more axles, are longer in length, and have larger diameter wheel assemblies. Measurement and inspection systems which are designed for use with passenger vehicles and light trucks (having only two axles) are configured for use in a standard vehicle service bays, and are generally are inadequate to accommodate the configurations found in heavy-duty vehicles. In addition, inspection of heavy-duty vehicles may require measurement or determination of vehicle characteristics which are not measured or determined for passenger vehicles and light trucks.

One example of a heavy-duty vehicle wheel alignment measurement system can be found in U.S. Pat. No. 9,778,030 B2 to McClenahan et al., which requires a heavy-duty vehicle undergoing measurement or inspection to remain stationary, and for optical targets or sensors to be secured to the outermost wheels on each axle. Measurements are acquired by observation of the optical targets using multiple cameras, or directly from the wheel mounted sensors, facilitating calculations of wheel alignments and axle orientations. Additional examples of multi-axle optical measurement systems for stationary heavy-duty vehicles can be found in U.S. Pat. No. 9,791,268 B2 to Buzzi et al., in U.S. Pat. No. 8,804,107 B2 to Giacomini et al., and in the IP.com publication No. IPCOM000136159D, entitled "Multi-Axle Heavy-Duty Vehicle Wheel Alignment System".

While systems for measuring both stationary passenger vehicles and stationary heavy-duty vehicles are highly accurate, they are difficult to adapt to drive-through heavy-duty vehicle inspection procedures, as they necessitate the attachment of components to the heavy-duty vehicle wheels. Inspection systems for non-contact measurement of moving passenger vehicles can acquire measurements as a vehicle wheel assembly is both rotated and translated past the sensors, i.e., as the vehicle on which it is mounted is rolled or driven through an inspection lane. For example, as shown in U.S. Pat. No. 10,068,389 B2 to Strege et al., U.S. Pat. No. 10,222,455 B2 to Stieff et al., and U.S. Pat. No. 10,241,195 B2 to Stieff et al., laser displacement sensors can be used to measure distances between fixed sensor assemblies and various points on rolling wheel assemblies at opposite ends of each axle for a two-axle vehicle driven at a slow speed between a pair of sensors. The non-contact inspection system acquires measurement data along chords of the individual wheel assemblies, from which approximations of the wheel spatial orientations can be derived. Measurements of wheel spatial orientation acquired from a moving vehicle are further evaluated to approximate axle total toe and wheel camber angle measures, enabling a vehicle service quick check or audit inspection to identify vehicles in need of a further alignment inspection and/or adjustment using a highly accurate stationary vehicle measurement system.

There is a need in the heavy-duty vehicle inspection industry for a drive-through non-contact inspection system which is capable of acquiring measurement data representative of wheel orientations and relative axle relationships for moving vehicles having three or more axles, including heavy-duty vehicles configured with multiple steering axles, multiple drive axles, pusher axles, and tag axles, as well as for moving vehicles with or without attached trailers.

BRIEF SUMMARY OF THE INVENTION

Briefly stated, the present disclosure sets forth a heavy-duty vehicle measurement system utilizing arrays of sensor modules disposed in housings on opposite sides of a sensing region within a heavy-duty vehicle inspection lane. The sensor modules acquire a set of displacement measurements associated with the side surfaces of a moving heavy-duty vehicle passing through the sensing region. Displacement measurements associated with one or more measurement axes is acquired independently by each of the sensor modules to measure distances to points on a surface of a heavy-duty vehicle passing through the sensing region. A processing system is configured to receive and evaluate the set of displacement measurements, together with known parameters of the measurement system, to identify heavy-duty vehicle features, such as body panels, wheel assemblies, and tire surfaces, and to calculate heavy-duty vehicle parameters such as velocity, wheel rim or tire dimensions, axle relative orientations (tandem scrub angles) and wheel assembly spatial orientations.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 4 is a prior art illustration of tandem scrub angles for a heavy-duty vehicle towing a trailer.

Corresponding reference numerals indicate corresponding parts throughout the several figures of the drawings. It is to be understood that the drawings are for illustrating the concepts set forth in the present disclosure and are not to scale.

Figure 1:
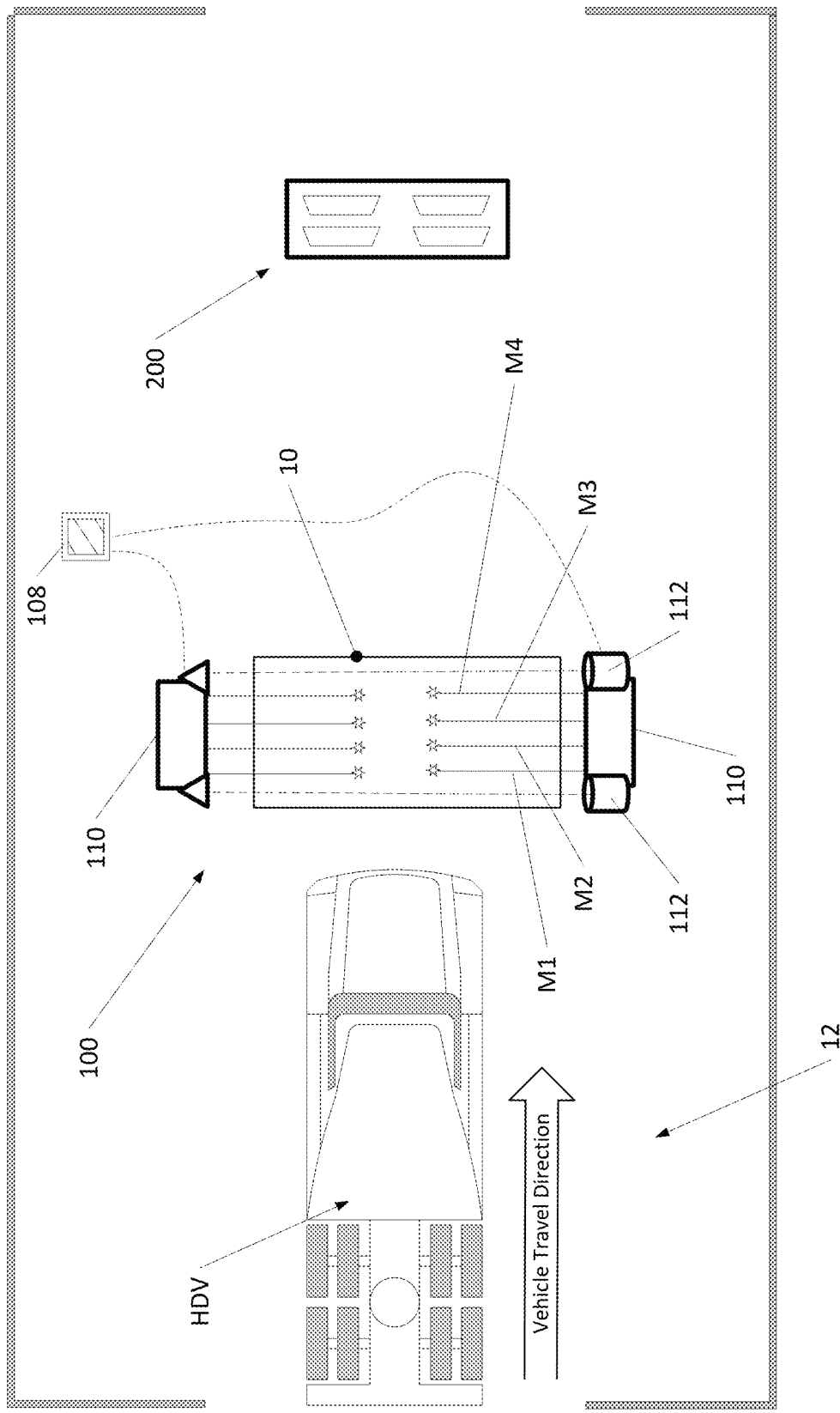
FIG. 1 is top plan view of a heavy-duty vehicle inspection lane including a drive-through non-contact vehicle inspection system.
Figure 2:
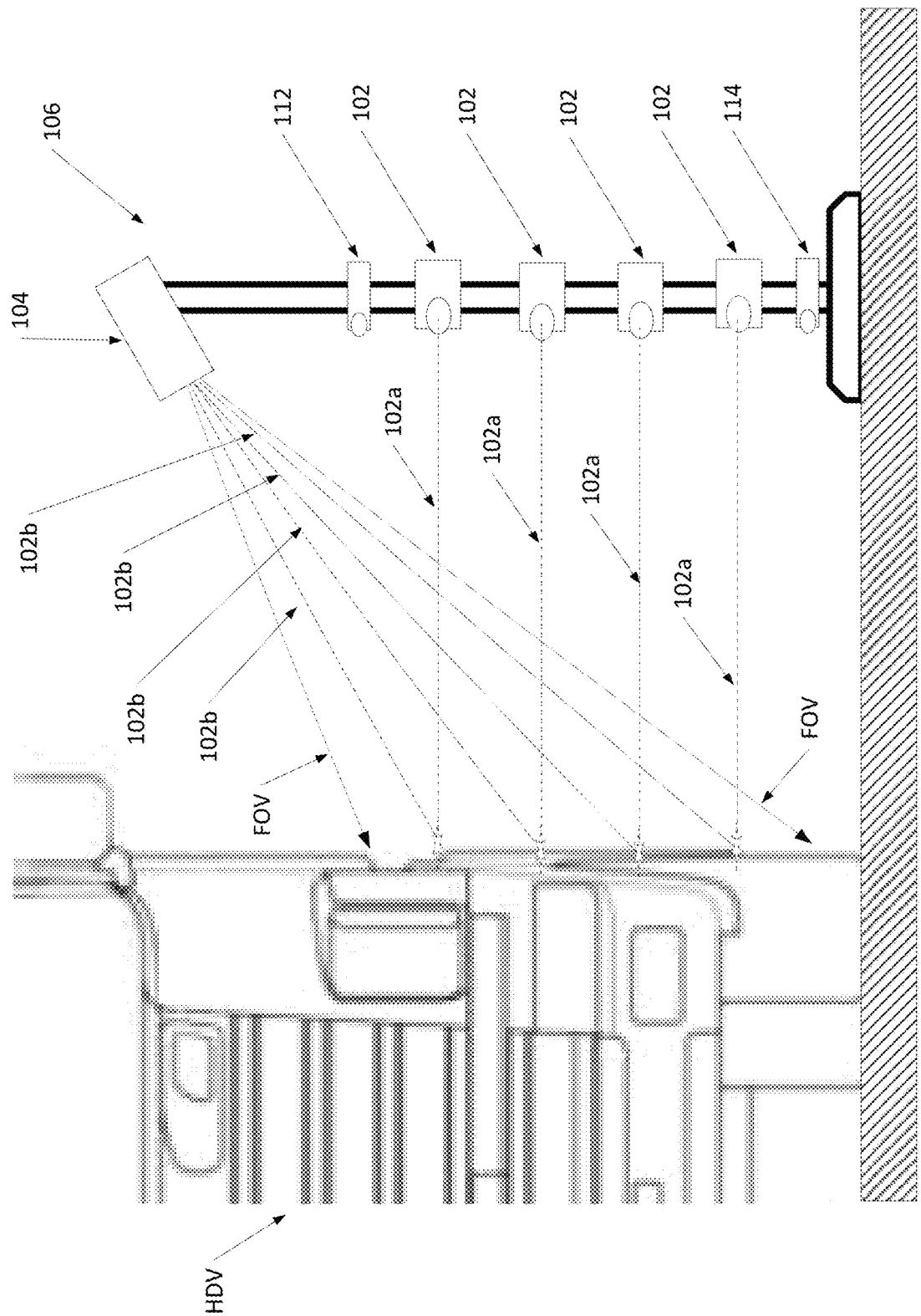
FIG. 2 illustrates a set of laser emitters in a vehicle inspection system sensor module illuminating the surface of a passing heavy-duty vehicle along vertically spaced contours.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

As used herein, the term heavy-duty vehicle is intended to define any heavy-duty vehicle or combination of heavy-duty vehicle and attached trailer, configured with three or more axles, including at least one steer axle and at least one drive axle. Additional axles may include, but are not limited to, steering axles, drive axles, pusher axles, tag axles, and trailer axles. Axles may be configured with single wheel assemblies at each end, dual wheel assemblies, or super-single wheel assemblies without departing from the intended scope of a heavy-duty vehicle. The term heavy-duty vehicle is not intended to limit the scope of heavy-duty vehicles, or combination of heavy-duty vehicles and attached trailers, by either weight or size.

A drive-through, non-contact inspection system 100 of the present disclosure is intended for use in a heavy-duty vehicle service or inspection lane drive-through configuration, where a moving heavy-duty vehicle HDV is driven through a sensing region 10 within the heavy-duty vehicle service or inspection lane 12, in a generally straight line (but not necessarily along, or parallel to, a longitudinal midline of the heavy-duty vehicle service or inspection lane 12), while being observed by an array of sensors acquiring displacement measurement data, and optionally, acquiring heavy-duty vehicle-associated still-frame or motion video images.

In a basic implementation, the drive-through non-contact inspection system 100 consists of two or more vertically aligned and spaced laser emitters 102 for illuminating contours along one side of a moving heavy-duty vehicle HDV passing through an inspection lane 12. An optical imaging system 104 associated with the laser emitters 102 acquires images of reflected laser light from the illuminated contour on the surface of the moving heavy-duty vehicle HDV. Together, an optical imaging system 104 and the associated laser emitters 102 comprise a single sensor module 106. The measurement hardware is duplicated on the opposite side of the inspection lane 12 to acquire data from the second side of the heavy-duty vehicle HDV. Those of ordinary skill in the art will recognize that as used herein, the term sensor module refers generally to the collection of operatively connected components which are utilized to perform the function of acquiring non-contact measurement data associated with a heavy-duty vehicle HDV passing through the inspection lane 12 or within operative proximity to the sensor modules 106.

A processing system 108 receives image data from the sensor modules 106 on each side of the heavy-duty vehicle HDV via any conventional data transmission means, such as a wired network, a wireless network, or any combination thereof. Data received at the processing system 108 is evaluated to calculate displacement measurements associated with the individual laser emitters 102 of each sensor module 106 illuminating contour lines on the heavy-duty vehicle surfaces, and to identify select measurement points on the illuminated contours which are located on the wheel assembly surfaces. Wheel assembly orientations and axle parameters, such as camber angles and axle total toe angles are determined by the processing system 108 from displacement offsets between selected measurement points, such as shown in U.S. Pat. No. 10,068,389 B2 to Strege et al., U.S. Pat. No. 10,222,455 B2 to Stieff et al., and U.S. Pat. No. 10,241,195 B2 to Stieff et al., each of which is herein incorporated by reference.

It will be understood by those of ordinary skill in the art that physical components of the processing system 108 may be located within an enclosure 110 housing the sensor modules, in a separate enclosure, or located at a remote location without departing from the scope of the present invention, provided suitable communication pathways and operative connections are maintained between the various sensors of the vehicle inspection system 100 and the processing system 108. In some embodiments, a portion of, or all of, the processing system 108 may be configured as a cloud-based processing system connected to the various sensors of the vehicle inspection system by means of a communications network such as the internet.

To account for an occurrence of outlier displacement measurements and to minimize the effect of variables such as wheel assembly runout, the presence of water on the wheels, and raised lettering on the tire sidewalls, an array of sensor modules 106 is disposed within the enclosures 110 on each side of the inspection lane 12. Each array is configured to acquire multiple independent displacement measurements to the surfaces of the heavy-duty vehicle HDV passing through the inspection lane 12. Within each enclosure 110 are at least four independent non-contact sensor modules 106, linearly spaced in a longitudinal direction of heavy-duty vehicle travel and facing inward towards the inspection lane 12. In an exemplary configuration, each independent non-contact sensor module 106 consists of four vertically aligned and separated illuminating laser emitters 102, together with a single optical imaging system 104. Greater or smaller numbers of sensor modules 106 and/or laser emitters 102 may be employed without departing from the scope of the present disclosure, depending upon the amount of displacement measurement data to be collected for processing and averaging. The laser emitters 102 are oriented to project generally parallel laser beams 102a through openings in the vehicle-facing side of each enclosure 110, illuminating the surfaces of the passing heavy-duty vehicle HDV at vertically spaced heights. The vertical spacing between each laser emitter 102 may be uniform, varied, or symmetric, provided it is either known or determinable, and is generally selected to ensure each laser emitter 102 illuminates a surface of a passing wheel assembly.

The optical imaging system 104 of each sensor module 106 is secured in vertical alignment with the associated laser emitters 102, oriented with a field of view FOV encompassing a portion of the inspection lane 12 through openings in the face of the enclosure 110. The optical imaging systems 104 are each configured to acquire images of reflected light 102b from the illuminated contours on the surfaces of the passing heavy-duty vehicle HDV. Resulting images from each optical imaging system 104 are conveyed to, and evaluated by, the processing system 108 to calculate displacement measurement data for each point of reflected laser light observed by the optical imaging systems 104 as the heavy-duty vehicle HDV passes through the inspection lane 12.

The combination of the optical imaging system 104 and illuminating lasers 102 in each sensor module 106 is configured to acquire displacement data from heavy-duty vehicle surfaces located within an effective operating range, based on the properties of the various optical elements. The range of operation for each sensor module 106 is sufficient to permit the enclosures to be placed on opposite sides of standard width inspection lanes suitable for use with heavy-duty vehicles while tolerating a limited amount of off-center positioning of the heavy-duty vehicle as it passes between the enclosures, accounting for driver error or steering corrections.

Vehicle detection modules comprising vehicle body detectors 112 and vehicle wheel detectors 114 aid in identifying the presence a passing heavy-duty vehicle wheel HDV within the operating range of the sensor modules. The vehicle detection modules 112 enable portions of measurement data acquired from a wheel assembly surface to be distinguished from the portions of measurement data acquired from a heavy-duty vehicle body panel or other surface. Identified portions of data acquired from the wheel assembly surfaces are evaluated by the programmed processing system 108 to locate displacement measurements corresponding to selected points on each wheel assembly of the heavy-duty vehicle HDV, such as peak points on each of the leading and trailing tire sidewall bulge surfaces, or on the circumferential wheel rim edge, such as shown in U.S. Pat. No. 10,068,389 B2 to Strege et al., U.S. Pat. No. 10,222,455 B2 to Stieff et al., and U.S. Pat. No. 10,241,195 B2 to Stieff et al. noted above. Those of ordinary skill in the art will recognize that as used herein, the term vehicle detection module refers to the collection of operatively connected components which are utilized to perform the function of detecting the presence of a vehicle component with a selected portion of the vehicle inspection lane or within operative proximity to the sensor modules. A vehicle detection module may be either separate from the enclosure 110 in which the sensor modules 106 are contained, or may be incorporated therein without departing from the scope of this disclosure. The vehicle detection module may be a self-contained sub-system, or may be integrated with the sensor modules, depending upon the particular hardware components utilized to carry out the vehicle detection functionality.

Within each wheel assembly portion of measured displacement data, peak bulges in the leading and trailing tire sidewall surfaces are represented by minimum displacement values identified along each illuminating laser axis 102a (i.e., points closest to the imaging sensor). These points can be identified by utilizing suitable mathematical analysis techniques, such as averaging the displacement values for adjacent data points, curve fitting along the illuminated contours, or slope analysis along the illuminated contours, such as shown in U.S. Pat. No. 10,408,610 B2 to Bernard et al., which is herein incorporated by reference. Preferably, at least five data points on an illuminated contour across the surface of a wheel assembly are required from each tire sidewall portion to sufficiently identify the leading and trailing tire sidewall peak bulges.

When multiple lasers beams 102a from a single sensor module 106 traverse across a moving wheel assembly surface, each laser beam 102a illuminates the tire sidewall at a different vertical height. Hence, each laser beam 102a potentially crosses the leading and trailing tire sidewall bulge surfaces at different points in time due to varying chord lengths across the wheel assembly. These differences provide sufficient data for multiple measurements of the tire orientation relative to the observing sensor module 106. Ideally, the selected points on a wheel assembly identified with a single sensor module 106 all lie within a common plane representative of the spatial orientation of that wheel assembly relative to the observing sensor module 106. Multiple pairs of displacement measurements associated with horizontally spaced leading and trailing tire sidewall bulge points, acquired from wheel assemblies at opposite ends of an axle, are utilized to determine a total toe angle for an axle, while vertically spaced pairs of displacement measurements for selected points on a tire sidewall surface of individual wheels are utilized to determine wheel assembly camber.

By utilizing four laterally spaced independent sensor modules 106 in an enclosure 110 on each side of the inspection lane 12, and with each sensor module 106 including four illuminating laser emitters 102, the drive-through non-contact heavy-duty vehicle inspection system illuminates 16 individual points within four measurement planes (M1-M4) for displacement measurement on each side of the passing heavy-duty vehicle HDV during a data acquisition cycle. At an image acquisition rate of 500 frames per second, 8000 individual data points per second are acquired from each side of the passing heavy-duty vehicle HDV. The individual data points are processed using various standard filtering methods to identify and discard outlier data points, resulting in a high degree of reliability and heavy-duty vehicle measurement repeatability, such as shown in U.S. Pat. No. 9,779,560 B2 to Dorrance et al. and U.S. Pat. No. 9,779,561 B2 to Dorrance et al., both of which are herein incorporated by reference.

Optionally, machine vision systems (i.e., still frame or video cameras) may be included incorporated into the drive-through non-contact heavy-duty vehicle inspection system 100 to acquire images of heavy-duty vehicle body panels for recording damage or misalignment, for observing tire sidewall markings to identify tire parameters, and/or for capturing information such as license plate characters or other heavy-duty vehicle-identifying features. An operator console, display, or other remote terminal may be included to provide an operator with a report containing information about the heavy-duty vehicle, such as wheel alignment conditions, tire wear conditions, tire pressure measurements, recalled heavy-duty vehicle and customer records, and/or recommended services.

During operation, displacement measurements to the surfaces on a moving heavy-duty vehicle HDV passing through the service or inspection lane 12 may be triggered in a variety of ways. In one embodiment, the vehicle detection modules components are configured to orient multiple optical triggers projecting trigger beams of light across the vehicle travel path through the inspection lane, such that a trigger beam is interrupted by the passage of the heavy-duty vehicle, initiating acquisition of displacement measurements by each sensor module 106, as well as measurement or data acquisition by other associated sensors. For optical triggers placed below the level of the heavy-duty vehicle structure (i.e., wheel triggers 114), the trigger beams 114a will be interrupted by the passage of the wheel assemblies on each axle of the heavy-duty vehicle HDV, providing an indication of specific periods of time during which relevant displacement measurements can be acquired from the wheel assembly surfaces. For optical triggers placed vertically higher (i.e., body triggers 112), the trigger beams 112a will be interrupted by the heavy-duty vehicle structure itself, and provide an indication of the specific period of time during which the heavy-duty vehicle is passing through the inspection lane sensing region 12, enabling differentiation between sequential vehicles. To accommodate a variety of power unit (tractor) and trailer configurations (low boys, flat-beds, box trailers, etc.) body triggers 112 may be disposed to provide trigger beams 112a along detection axes at multiple vertical elevations and/or orientations across the service or inspection lane 12, ensuring that at least one trigger beam 112a remains interrupted at all times while the heavy-duty vehicle HDV is present within the service or inspection lane. With multiple optical triggers 112, 114, a sequence and frequency of trigger beam 112a, 114a interruptions may be utilized to identify the presence and configuration of the heavy-duty vehicle HDV, the number of axles passing the sensor modules 106, the velocity of the heavy-duty vehicle, and changes in acceleration of the heavy-duty vehicle within the sensing region (or between the spaced optical triggers).

Utilizing a one or more body triggers 112 with detection axes 112a oriented for interruption by the heavy-duty vehicle (or trailer) structure, together with at least one lower optical trigger (i.e., a wheel sensor 114) with a detection axis 112a at a height suitable for interruption only by the wheel assemblies, enables detected individual wheel assemblies to be correctly associated with back-to-back heavy-duty vehicles. One or more body sensors 112 are interrupted as the heavy-duty vehicle enters the sensing region, identifying the presence of the heavy-duty vehicle. Passage of the heavy-duty vehicle through the sensing region alternately blocks and unblocks the wheel sensors 114, detecting each wheel assembly/axle of the heavy-duty vehicle (and trailer). So long as at least one body sensor 112 remains interrupted by the structure of either the heavy-duty vehicle or an associated trailer, the blocking and unblocking of the wheel sensors 114 facilitates association of displacement measurements with the wheel assemblies on individual axles of the heavy-duty vehicle. When all of the body sensors 112 are unblocked as the heavy-duty vehicle (or trailer) departs the observation area, an axle count from the wheel sensors 114 is reset, and the system 100 is ready to receive the next heavy-duty vehicle in back-to-back succession.

Figure 3:
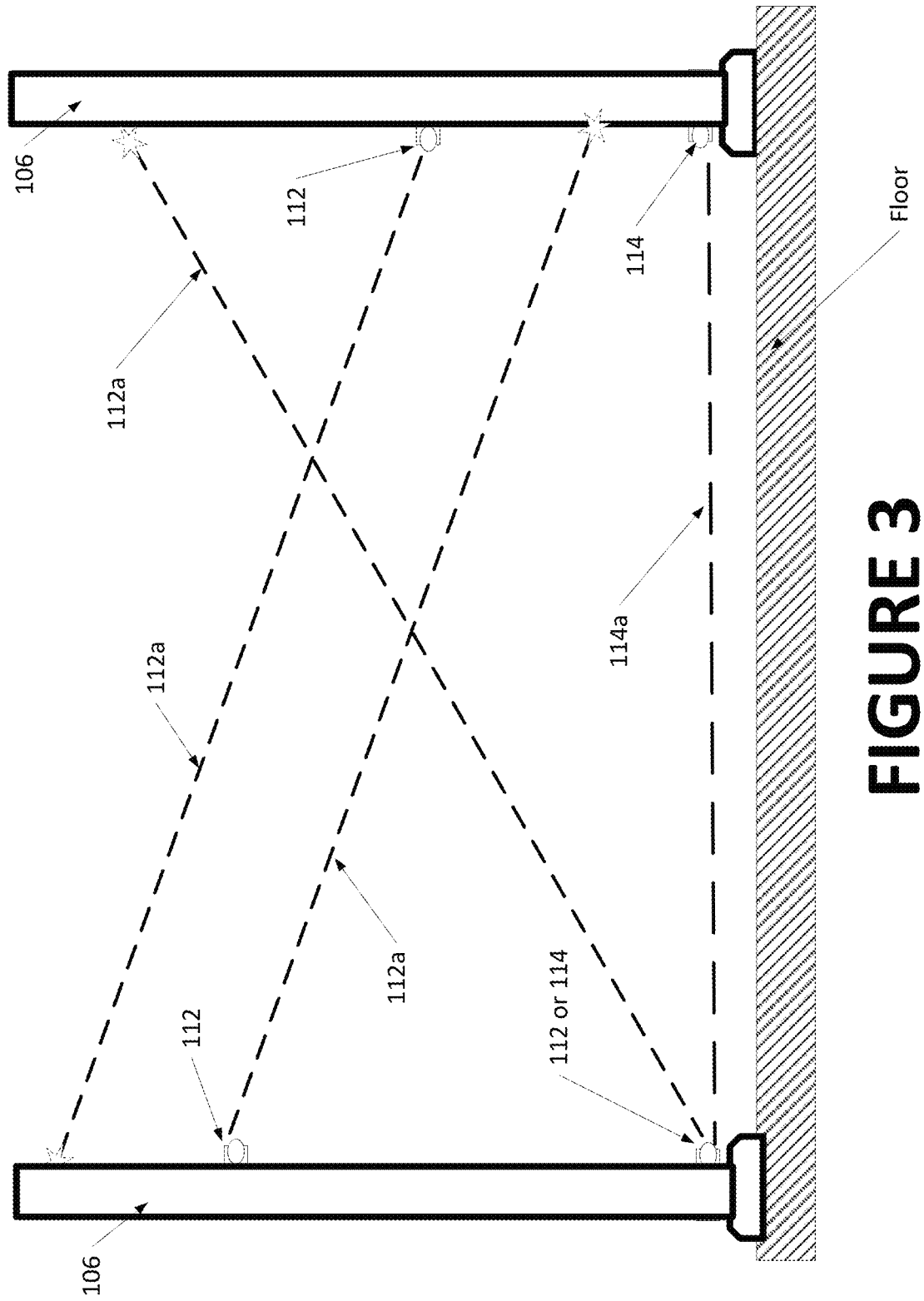
FIG. 3 is an exemplary configuration of optical triggers in a vehicle inspection system crossing an inspection lane at angled orientations.

In an exemplary configuration illustrated in FIG. 3, one or more body sensors 112 disposed in the sensor housings 106 on opposite sides of an inspection lane are oriented with trigger beams 112a aligned to detection axes which are angled relative to the floor surface (i.e., neither parallel to, nor orthogonal to the floor). Each body sensor 112 may be configured with a detection axis 112a oriented to extend either angled upward or angled downward laterally across the inspection lane 12, with body sensors 112 on opposite sides of the inspection lane 12 having either similar or opposite detection axis orientations. Providing an angular orientation to the detection axes for body sensors 112 increases the likelihood of passing heavy-duty vehicles HDV having varying heights and/or configurations continuously interrupt at least one optical beam 112a throughout the duration of passage through the inspection lane 12.

Inspection of heavy-duty vehicles HDV having three or more axles requires a determination of axle parameters and reference axes which differ from those determined for passenger vehicles and light trucks. These axle parameters and reference axes include individual axle thrust angles and tandem scrub angles between pairs of longitudinally spaced tandem axles, such as shown in FIG. 4, as well as identification of a primary longitudinal reference axis for the vehicle, such as a vehicle thrust axis, a vehicle body centerline, or a vehicle geometric centerline. In one embodiment of the present disclosure, the primary longitudinal reference axis is the geometric centerline of the heavy-duty vehicle HDV defined as an axis connected a midpoint of a front axle to the midpoint of a rear axle designated as a reference axle, typically the rearmost driven axle. In an alternative embodiment, the primary longitudinal reference axis is defined by the longitudinal centerline of the vehicle's frame structure.

A drive-through inspection system configured for passenger vehicles and light trucks may identify an axle total toe angle for each individual axle of the vehicle, which is determined by the orientation of the outermost wheel assemblies on the axle. For heavy-duty vehicles, axle orientation for each non-steer axle is defined by an axle thrust line, which is a bisector of the axle total toe angle for the selected axle. The orientation of an axle thrust line relative to the selected primary longitudinal reference axis for the vehicle is defined as the axle thrust angle. On heavy-duty vehicles having three or more axles, there exist multiple axle thrust lines and multiple axle thrust angles, each associated with a specific non-steer axle. For longitudinally adjacent non-steer axles, an angle formed between the two associated axle thrust lines defines a tandem scrub angle, and is indicative of a non-parallel condition, or misalignment, between the two adjacent axles. When a tandem scrub angle is present in a heavy-duty vehicle, the tandem pair of axles exert a net force on the moving vehicle which is off-axis from a straight-ahead travel direction, necessitating a steering counter action by the wheels on the vehicle's steer axles, resulting in increased fuel consumption, increased tire wear, and poor vehicle handling.

In one embodiment, the inspection system 100 of the present disclosure includes a processing system 108 configured with software instructions to calculate tandem scrub angles between pairs of non-steer axles of a heavy-duty vehicle HDV passing through the inspection lane 12. The two non-steer axles defining a pair of axles most often are in a longitudinally adjacent or tandem configuration, but may be defined by any pair of axles on the vehicle regardless of longitudinal spacing or the presence of additional axles disposed there between. As used herein, the term tandem scrub angle shall be understood to refer to the scrub angle between any two axles of a heavy-duty vehicle.

Figure 5:
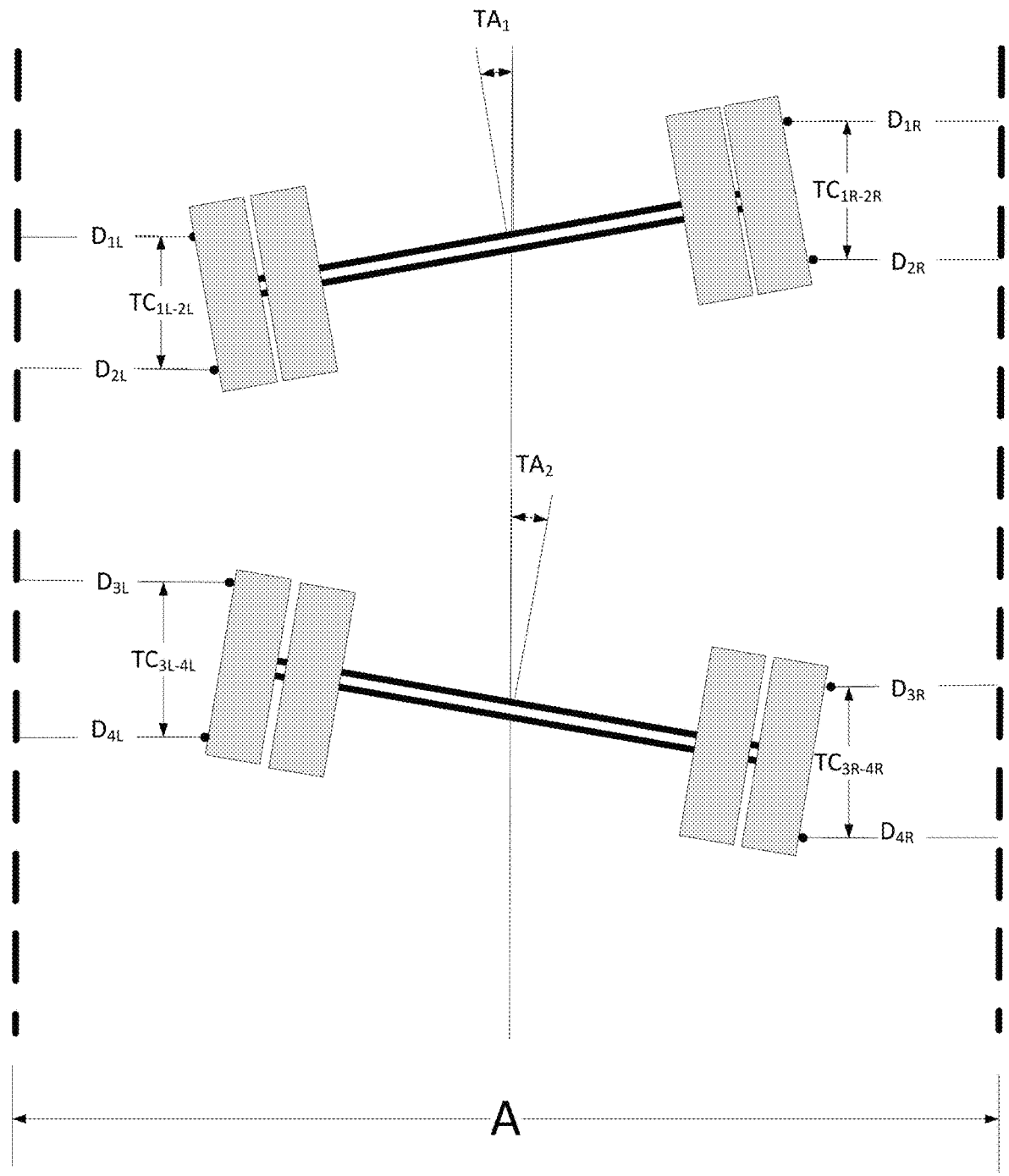
FIG. 5 is a first representation of measurement points on the wheels of a pair of tandem axles used to identify individual axle thrust lines for axle scrub angle calculations (axle orientations are exaggerated for illustration purposes).

As shown in FIG. 5, displacement measurements "D" for each axle are acquired by the inspection system 100 from pairs of longitudinally spaced locations on the surfaces of the opposite outermost wheel assemblies, typically corresponding to the leading and trailing tire bulge points along illuminated contours of the tires. For inspection systems in which the lateral spacing "A" between sensor modules 106 on the opposite sides of the inspection lane 12 is known or determinable, a measure of the lateral width of each axle (TW) can be calculated using calculated displacements to the midpoints on the line segments connecting each pair of longitudinally spaced locations on each wheel assembly outer surface. With this information, the axle thrust angle $TA_1$ for a first non-steer axle in a tandem pair of axles is determined according to:

$$TA_1 = \tan^{-1}\left[\frac{[(D_{1L} - D_{2L}) - (D_{1R} - D_{2R})]/2}{TW_1}\right] \quad \text{Eqn. 1}$$

-continued where $$TW_1 \cong A - [[(D_{1L} - D_{1R}) + (D_{2L} - D_{2R})]/2] \qquad \text{Eqn. 2}$$

and where $D_{1L}$, and $D_{2L}$ are displacement measurements to the leading and trailing points of the left outermost wheel assembly on the first axle, and $D_{1R}$ and $D_{2R}$ are displacement measurements to the leading and trailing points of the right outermost wheel assembly on the first axle.

Correspondingly, the axle thrust angle $TA_2$ for a second non-steer axle in the pair of axles, assuming the vehicle continues to travel in a straight line through the inspection lane, is determined according to:

$$TA_2 = \tan^{-1}\left[\frac{[(D_{3L} - D_{4L}) - (D_{3R} - D_{4R})]/2}{TW_2}\right] \qquad \text{Eqn. 3}$$

where $$TW_2 \cong A - [[(D_{3L} - D_{3R}) + (D_{4L} - D_{4R})]/2] \qquad \text{Eqn. 4}$$

and where $D_{3L}$, and $D_{4L}$ are displacement measurements to the leading and trailing points of the left outermost wheel assembly on the second axle, and $D_{3R}$ and $D_{4R}$ are displacement measurements to the leading and trailing points of the right outermost wheel assembly on the second axle.

The tandem scrub angle between axle 1 and axle 2 is calculated according to:

$$\text{SCRUB}_{1-2} = TA_1 - TA_2 \qquad \text{Eqn. 5}$$

Determination of a tandem scrub angle between axle 2 and a next subsequent axle, designated as axle 3 (not shown), is calculated in the same manner, substituting the displacement measurements values for axle 2 into Equations 1 and 2, and for axle 3 into Equations 3 and 4 before determining the tandem scrub angle using Equation 5. This process may be repeated until a tandem scrub angle between each longitudinally adjacent non-steer axle of the heavy-duty vehicle HDV has been determined by the processing system, providing sufficient data to identify the tandem scrub angle of any selected non-steer axle relative to any other non-steer axle on the vehicle. The tandem scrub angles can be stored together with other measurements acquired by the vehicle inspection system for a given vehicle.

In another embodiment, the processing system is configured with software instructions to the calculate tandem scrub angles between pairs of non-steer axles of heavy-duty vehicles passing through the inspection lane. As shown in FIG. 5, displacement measurements "D" are acquired by the inspection system for each axle, to pairs of longitudinally spaced locations on the surfaces of the opposite outermost wheel assemblies, for example, the leading and trailing tire bulge points along illuminated contours of the tires. The longitudinal spacing between the selected measurement points for each axle define a chord length TC across the tire face at the height of the displacement sensor. The value TC may either be a calculated value for each individual displacement sensor, or may be set at a predetermined value corresponding to the vertical elevation of the displacement sensor and a standardized tire diameter. With this information, the axle thrust angle $TA_1$ for a first non-steer axle in a tandem pair of axles is determined according to:

$$TA_1 = \frac{\tan^{-1}\left[\frac{D_{1L} - D_{2L}}{TC_{1L-2L}}\right] + \tan^{-1}\left[\frac{D_{1R} - D_{2R}}{TC_{1R-2R}}\right]}{2} \qquad \text{Eqn. 6}$$

where $D_{1L}$, and $D_{2L}$ are displacement measurements to the leading and trailing points of the left outermost wheel assembly of the first axle, $TC_{1L-2L}$ is the longitudinal separation between the leading and trailing points on the left outermost wheel assembly of the first axle, $D_{1R}$ and $D_{2R}$ are displacement measurements to the leading and trailing points of the right outermost wheel assembly of the first axle, and $TC_{1R-2R}$ is the longitudinal separation between the leading and trailing points on the right outermost wheel assembly of the first axle.

Correspondingly, the axle thrust angle $TA_2$ for a second non-steer axle in the pair of axles, assuming the vehicle continues to travel in a straight line through the inspection lane, is determined according to:

$$TA_2 = \frac{\tan^{-1}\left[\frac{D_{3L} - D_{4L}}{TC_{3L-4L}}\right] + \tan^{-1}\left[\frac{D_{3R} - D_{4R}}{TC_{3R-4R}}\right]}{2} \qquad \text{Eqn. 7}$$

where $D_{3L}$, and $D_{4L}$ are displacement measurements to the leading and trailing points of the left outermost wheel assembly of the second axle, $TC_{3L-4L}$ is the longitudinal separation between the leading and trailing points on the left outermost wheel assembly of the second axle, $D_{3R}$ and $D_{4R}$ are displacement measurements to the leading and trailing points of the right outermost wheel assembly of the second axle, and $TC_{3R-4R}$ is the longitudinal separation between the leading and trailing points on the right outermost wheel assembly of the second axle.

The tandem scrub angle between axle 1 and axle 2 is then calculated according to Equation 5, as shown above.

Determination of a tandem scrub angle between axle 2 and a next subsequent axle, designated as axle 3 (not shown), is calculated in the same manner, substituting the displacement measurements values for axle 2 into Equation 6, and for axle 3 into Equation 7 before determining the tandem scrub angle using Equation 5. This process may be repeated until a tandem scrub angle between each longitudinally adjacent non-steer axle of the heavy-duty vehicle has been determined by the processing system, providing sufficient data to identify the tandem scrub angle of any selected non-steer axle relative to any other non-steer axle on the vehicle. Individual tandem axle scrub angles can be stored together with other measurements acquired by the vehicle inspection system for a given vehicle.

For with heavy-duty vehicles, the rear-most drive axle is commonly defined to be a "reference axle", and the tandem scrub angles of each additional non-steerable axle may optionally be identified relative directly to the orientation of the reference axle, by always defining the reference axle as axle 1 in Equation 5. Using this information, axles which are misaligned relative to the defined reference axle of the heavy-duty vehicle, can be readily identified by the processor 108 of the vehicle inspection system 100.

Results obtained by the drive-through non-contact inspection system 100 for a heavy-duty-vehicle HDV passing through a service or inspection lane 12 can be stored and/or presented to an operator in a variety of different ways. In one embodiment, measurement data acquired as a heavy-duty vehicle HDV passes through the inspection lane 12 is compiled into a vehicle record, and is either stored locally or communicated via a communications network to a remote system for storage and/or further processing. In another embodiment, the measurement data is utilized locally at the drive-through non-contact inspection system 100 to generate a vehicle inspection report, identifying specific elements of the heavy-duty vehicle HDV which fall within/fail to meet designated specification tolerances, and/or providing a pass/fail designation for the heavy-duty vehicle HDV as an indication of a need for follow-up evaluation. The drive-through non-contact inspection system 100 can be configured with a suitable means for conveying results data to an operator (or any other designated recipient), such as in the form of printed reports, displayed reports, or electronic communications via text, e-mail, or mobile apps.

In a further embodiment, the drive-through non-contact inspection system 100 for a heavy-duty vehicle HDV is configured to operate in conjunction with one or more supplemental measurement systems 200, such as a drive-over tire pressure measurement system and/or a drive-over tire tread depth measurement system. When configured with a supplemental measurement system 200, measurement data and/or inspection results from the drive-through non-contact inspection system 100 and the supplemental measurement system 200 are each associated with the specific vehicle passing through the inspection lane, and either stored or presented to an operator in a combined vehicle inspection report. For measurements which are not acquired simultaneously, the association between measurement results for a heavy-duty vehicle HDV identified by the drive-through non-contact inspection system 100 and measurement results obtained by the supplemental measurement system 200 may be made by counting the number of axles on each passing heavy-duty vehicle, or by timestamping data, or by any other suitable method of distinguishing between heavy-duty vehicles passing sequentially through the inspection lane 12.

For example, as a heavy-duty vehicle HDV having three or more axles passes through the inspection lane 12 the drive-through non-contact inspection system 100 identifies the number of axles associated with the vehicle, and determines relevant measurements and inspection results. A supplemental measurement system 200, such as a tire tread depth measurement system operating in conjunction with the drive-through non-contact inspection system, acquires tire tread depth measurements from each wheel assembly passing through the inspection lane 12. Utilizing vehicle-specific data acquired by the drive-through non-contact inspection system 100, such as the axle count for each individual vehicle, measurement acquired by the supplemental tire tread depth measurement system can be indexed to the wheel assemblies on each axle of the heavy-duty vehicle for inclusion with other vehicle inspection results. Similarly, a drive-over tire pressure measurement system operating in conjunction with the drive-through non-contact inspection system determines tire pressure measurements from each wheel assembly passing through the inspection lane by way of load cells, acquisition of TPMS data, or tire footprint analysis, etc. Utilizing vehicle-specific data acquired by the drive-through non-contact inspection system 100, such as the axle count for each individual vehicle, measurement acquired by the supplemental tire pressure measurement system can be indexed to the wheel assemblies on each axle of the heavy-duty vehicle HDV for inclusion with other vehicle inspection results.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A non-contact vehicle inspection system configured to measure one or more parameters associated with one or more heavy-duty vehicles in motion through an inspection lane, each having at least a first steerable axle together with a plurality of additional axles, comprising:
   a plurality of sensor modules disposed on opposite lateral sides of said inspection lane, said sensor modules configured to acquire measurement data representative of displacements between a plurality of laser emitters and points on said passing heavy-duty vehicles illuminated by said laser emitters;
   a processing system configured to receive said acquired measurement data from said plurality of sensor modules, said processing system configured with software instructions to evaluate said received measurement data representing displacements to determine a relative thrust angle in relation to an axis of said inspection lane for each axle in at least a pair of said additional axles; and
   wherein said processing system is further configured with software instructions to determine from said relative thrust angles, a representation of a tandem scrub angle between at least said one pair of said additional axles associated with said passing heavy-duty vehicle.

2. The non-contact vehicle inspection system of claim 1 further including a vehicle detection module, said vehicle detection module having a plurality of sensors responsive to vehicle components crossing detection axes, wherein at least a first sensor is a wheel sensor responsive to passing vehicle wheel assemblies, and wherein at least a second sensor is a body sensor responsive to passing vehicle body structures; and
   wherein said processing system is further configured to receive detection data from said vehicle detection module to associate said received measurement data from said plurality of sensor modules with detected heavy-duty vehicles and with individual axles on said detected heavy-duty vehicles.

3. The non-contact vehicle inspection system of claim 2 wherein a detection axis of at least one body sensor is oriented neither parallel to, nor orthogonal to, a floor surface of said inspection lane.

4. The non-contact vehicle inspection system of claim 2 wherein said processing system is further configured to generate from said received detection data, a representation of at least one heavy-duty vehicle characteristic, said heavy-duty vehicle characteristic selected from a set of characteristics including an axle count, a vehicle longitudinal length, and a presence or absence of a towed trailer.

5. The non-contact vehicle inspection system of claim 1 further including at least one imaging sensor operatively coupled to convey video image data to said processing system, said imaging sensor having a field of view oriented to acquire video image data associated with said heavy-duty vehicle moving through said inspection lane; and
  wherein said processing system is further configured with software instructions to utilize said conveyed video image data to acquire data representative of at least one characteristic of said heavy-duty vehicle, said characteristic selected from a set of characteristics including a vehicle identifier, a wheel assembly dimension, a vehicle body dimension, a vehicle configuration, a vehicle speed, and a vehicle travel direction within said inspection lane.

6. The non-contact vehicle inspection system of claim 1 further including a communications interface operatively connected to said processing system; and
  wherein processing system is configured with software instructions to communicate said received measurement data and/or any representations of characteristics of said heavy-duty vehicle derived from said received measurement data by said processing system, to a remote data storage system.

7. The non-contact vehicle inspection system of claim 1 further including an operator interface operatively connected to said processing system; and
  wherein processing system is configured with software instructions to receive input from an operator identifying at least an axle configuration of a heavy-duty vehicle associated with said received measurement data.

8. A non-contact vehicle inspection system configured to measure one or more parameters associated with one or more heavy-duty vehicles passing through an inspection lane, each having at least a first steerable axle together with a plurality of additional axles, comprising:
  a plurality of sensor modules disposed on opposite lateral sides of said inspection lane, said sensor modules configured to acquire measurement data representative of displacements between a plurality of laser emitters and points on said passing heavy-duty vehicles illuminated by said laser emitters;
  a processing system configured to receive said acquired measurement data from said plurality of sensor modules, said processing system configured with software instructions to evaluate said received measurement data to determine an orientation of an outermost wheel assembly on each identified axle;
  wherein said processing system is configured with software instructions to determine from said received measurement data, a representation of a tandem scrub angle for at least one pair of said additional axles associated with said passing heavy-duty vehicle according to:

$$SCRUB_{1-2} = TA_1 - TA_2$$

where $TA_1$ is the thrust angle for axle 1, and $TA_2$ is the thrust angle for axle 2;
  wherein said axle thrust angles for said pair of axles are calculated according $$TA_1 = \frac{\tan^{-1}\left[\frac{D_{1L} - D_{2L}}{TC_{1L-2L}}\right] + \tan^{-1}\left[\frac{D_{1R} - D_{2R}}{TC_{1R-2R}}\right]}{2}$$

$$TA_2 = \frac{\tan^{-1}\left[\frac{D_{3L} - D_{4L}}{TC_{3L-4L}}\right] + \tan^{-1}\left[\frac{D_{3R} - D_{4R}}{TC_{3R-4R}}\right]}{2}$$

where for a first axle in said pair, $D_{1L}$, and $D_{2L}$ are displacement measurement to the leading and trailing points of a left outermost wheel assembly, $TC_{1L-2L}$ is the longitudinal separation between the leading and trailing points on said left outermost wheel assembly, $D_{1R}$ and $D_{2R}$ are displacement measurements to the leading and trailing points of a right outermost wheel assembly, and $TC_{1R-2R}$ is the longitudinal separation between the leading and trailing points on said right outermost wheel assembly; and
  for a second axle in said pair, $D_{3L}$, and $D_{4L}$ are displacement measurements to the leading and trailing points of a left outermost wheel assembly, $TC_{3L-4L}$ is the longitudinal separation between the leading and trailing points on said left outermost wheel assembly, $D_{3R}$ and $D_{4R}$ are displacement measurements to the leading and trailing points of a right outermost wheel assembly, and $TC_{3R-4R}$ is the longitudinal separation between the leading and trailing points on said right outermost wheel assembly.

9. The non-contact vehicle inspection system of claim 1 wherein said processing system is a cloud-based processing system configured to receive said data from said plurality of sensor modules via a communication network.

10. The non-contact vehicle inspection system of claim 1 wherein said processing system is further configured with software instructions to generate a generate a vehicle inspection report responsive to said determination of said at least one tandem scrub angle, identifying specific elements of an inspected heavy-duty vehicle which fall within, or fail to meet, designated specification tolerances, and/or providing a pass/fail designation for said inspected heavy-duty vehicle.

11. The vehicle inspection system of claim 1 further including
  a drive-over tire tread depth measurement system configured to acquire a plurality of measurements of tire tread depth from at least one wheel assembly of said passing heavy-duty vehicle;
  wherein said processing system is further configured to receive said plurality of tire tread depth measurements from said drive-over tire tread depth measurement system, said processing system further configured with software instructions to generate an inspection report associated with said passing heavy duty vehicle, said inspection report including each identified tandem scrub angle and, for at least one of said wheel assemblies, a representation of tire tread depth from said plurality of tire tread depth measurements.

12. The vehicle inspection system of claim 1 further including:
  a drive-over tire pressure measurement system configured to acquire a measure of tire pressure for at least one wheel assembly of said passing heavy-duty vehicle; and
  wherein said processing system is further configured to receive said tire pressure measurements from said drive-over tire pressure measurement system, and with software instructions to generate an inspection report associated with said passing heavy duty vehicle, said inspection report including each identified tandem scrub angle and a representation of said measured tire pressures.

13. A system for assessing axle orientations associated with a moving heavy-duty vehicle having at least one steer axle and at least two non-steer axles, the system comprising:
a stationary apparatus for generating, while the heavy-duty vehicle is moving through an inspection lane, output signals indicative of displacements from fixed laser emitters to first and second points on the outer surfaces of each outermost wheel assembly on the steer axle and at least a pair of said non-steer axles of the heavy-duty vehicle; and
a control system coupled to receive the output signals from the stationary apparatus and configured with software instructions to utilize said received output signals to determine for each outermost wheel assembly on each passing axle, a set of displacement measurements to leading and trailing points and an associated longitudinal separation measurement between said leading and trailing points; and
wherein said control system is further configured with software instructions to utilize said displacement measurements and said longitudinal separation measurements for each outermost wheel assembly on a pair of said non-steer axles to calculate associated relative thrust angles in relation to a central axis of said inspection lane, and a tandem scrub angle for said pair of non-steer axles.

14. The system of claim 13 wherein said stationary apparatus includes at least one optical interrupt trigger configured to detect a presence of said heavy-duty vehicle within said inspection lane, said optical trigger having a detection axis projecting laterally across said inspection lane, at an angled orientation within a vertical plane relative to a floor surface over which said heavy-duty vehicle is moving.

15. A system for assessing axle orientations associated with a moving heavy-duty vehicle having at least one steer axle and at least two non-steer axles, the system comprising:
a stationary apparatus for generating, while the heavy-duty vehicle is moving through an inspection lane, output signals indicative of displacements from fixed laser emitters to first and second points on the outer surfaces of each outermost wheel assembly on the steer axle and non-steer axles of the heavy-duty vehicle; and
a control system coupled to receive the output signals from the stationary apparatus and configured with software instructions to determine, from said received output signals, a tandem scrub angle for at least the two non-steer axles based on said output signals;
wherein said control system is configured to determine said tandem scrub angle according to:

$$SCRUB_{1-2} = TA_1 - TA_2$$

where $TA_1$ is the thrust angle for axle 1, and $TA_2$ is the thrust angle for axle 2 wherein said axle thrust angles for said pair of axles are calculated according to:

$$TA_1 = \frac{\tan^{-1}\left[\frac{D_{1L} - D_{2L}}{TC_{1L-2L}}\right] + \tan^{-1}\left[\frac{D_{1R} - D_{2R}}{TC_{1R-2R}}\right]}{2}$$

$$TA_2 = \frac{\tan^{-1}\left[\frac{D_{3L} - D_{4L}}{TC_{3L-4L}}\right] + \tan^{-1}\left[\frac{D_{3R} - D_{4R}}{TC_{3R-4R}}\right]}{2}$$

where for a first axle in said pair, $D_{1L}$, and $D_{2L}$ are displacement measurements to the leading and trailing points of a left outermost wheel assembly, $TC_{1L-2L}$ is the longitudinal separation between the leading and trailing points on said left outermost wheel assembly, $D_{1R}$ and $D_{2R}$ are displacement measurements to the leading and trailing points of a right outermost wheel assembly, and $TC_{1R-2R}$ is the longitudinal separation between the leading and trailing points on said right outermost wheel assembly; and
for a second axle in said pair, $D_{3L}$, and $D_{4L}$ are displacement measurements to the leading and trailing points of a left outermost wheel assembly, $TC_{3L-4L}$ is the longitudinal separation between the leading and trailing points on said left outermost wheel assembly, $D_{3R}$ and $D_{4R}$ are displacement measurements to the leading and trailing points of a right outermost wheel assembly, and $TC_{3R-4R}$ is the longitudinal separation between the leading and trailing points on said right outermost wheel assembly.

16. The non-contact vehicle inspection system of claim 1 wherein said relative axle thrust angles for said pair of additional axles are calculated according to:

$$TA_1 = \tan^{-1}\left[\frac{[(D_{1L} - D_{2L}) - (D_{1R} - D_{2R})]/2}{A - [[(D_{1L} - D_{1R}) + (D_{2L} - D_{2R})]/2]}\right]$$

$$TA_2 = \tan^{-1}\left[\frac{[(D_{3L} - D_{4L}) - (D_{3R} - D_{4R})]/2}{A - [[(D_{3L} - D_{3R}) + (D_{4L} - D_{4R})]/2]}\right]$$

where A is a lateral spacing between said plurality of sensor modules on opposite lateral sides of said inspection lane;
wherein for a first axle in said pair, $D_{1L}$, and $D_{2L}$ are displacement measurements to the leading and trailing points of a left outermost wheel assembly, $D_{1R}$ and $D_{2R}$ are displacement measurements to the leading and trailing points of a right outermost wheel assembly; and
for a second axle in said pair, $D_{3L}$, and $D_{4L}$ are displacement measurements to the leading and trailing points of a left outermost wheel assembly, $D_{3R}$ and $D_{4R}$ are displacement measurements to the leading and trailing points of a right outermost wheel assembly.

* * * * *